United States Patent Office 3,347,877
Patented Oct. 17, 1967

3,347,877
CIS- AND TRANS-DIAZIDOHEXAPHENYLCYCLO-PHOSPHONITRILE TETRAMER
Clay M. Sharts, San Diego, Calif., assignor to the United States of America as represented by the Secretary of the Navy
No Drawing. Filed Oct. 6, 1965, Ser. No. 493,585
2 Claims. (Cl. 260—349)

ABSTRACT OF THE DISCLOSURE

Trans- and cis-diazidohexaphenylphosphonitrile tetramers are synthesized by reacting dichlorohexaphenylphosphonitrile tetramer with lithium azide. The two isomers have M.P. 206–208° C. and M.P. 146–148° C. respectively.

---

The invention herein described may be manufactured and used by or for the Government of the United States of America for governmental purposes without the payment of any royalties thereon or therefor.

This invention relates to polymers and more particularly to the preparation of a novel polymer intermediate, diazidohexaphenylphosphonitrile tetramer which exists as trans- and cis-isomers.

The invention described herein is a polymerizable diazide derived from a thermally stable phosphonitrile tetramer. Polymers derived from diazidohexaphenylphosphonitrile tetramer and bis-phosphines are much more easily formed by condensation reactions than polymers from most other systems. No special catalysts are required, and polymerizations are self-purging of impurities because of continuous nitrogen evolution during polymerization.

The trans- and cis-diazidohexaphenylphosphonitrile tetramers prepared by the process described herein are useful intermediates in polymerizations with bis-phosphines to give superior thermally stable polymers of high molecular weight. Polymers derived from these diazido tetramers are useful as laminating agents, coatings, adhesives, and resins capable of withstanding temperatures far in excess of those where conventional polymers fail. These diazides are also useful as high temperature blowing agents for generating nitrogen smoothly and continuously until consumed.

It is an object of the invention to provide a novel polymer intermediate.

Another object of the invention is to provide novel intermediate compounds useful in polymerizations with bis-phosphines to give superior thermally stable polymers.

A further object of the invention is to provide high-temperature blowing agents which evolve nitrogen smoothly and continuously until consumed.

Other objects and many of the attendant advantages of this invention will become readily appreciated as the same becomes better understood by reference to the following detailed description.

The diazidohexaphenylphosphonitrile tetramer, which exists as two isomers of M.P. 206–208° C. and M.P. 146–148° C. designated as the trans- and cis-isomers respectively, is prepared by the reaction of dichlorohexaphenylphosphonitrile tetramer [Herring and Douglas, "Inorganic Chemistry," 4, 1012 (1965)] with lithium azide to give a diazido compound in which the chlorines have been replaced by the azido group. The preparation of the starting compound, dichlorohexaphenylphosphonitrile tetramer, is described in the aforementioned publication.

The operation in obtaining and isolating two isomers was carried out as hereinafter described:

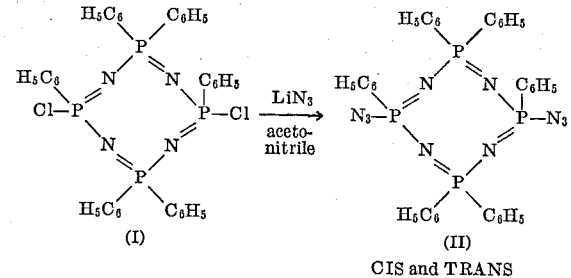

CIS and TRANS

Example 1

Diazidohexaphenylcyclophosphonitrile tetramer hereafter referred to as tetramer diazide, was prepared by heating a mixture of 0.80 g. (0.0011 mole) of dichlorohexaphenylcyclophosphonitrile and 2.0 g. (0.041 mole) of lithium azide in 50 ml. of anhydrous acetonitrile. The reactants were heated for 3 days under reflux conditions. The starting materials were insoluble in acetonitrile, as was the lithium chloride product. The reaction solution was filtered hot, and 2.1 g. of solid was recovered. The hot acetonitrile filtrate was reduced in volume by distilling off acetonitrile until only 25 ml. remained; this was set aside to cool. A first crop of crystals amounting to 0.2 g. was obtained. Evaporation of the solvent twice gave two additional crops of crystals totaling 0.11 and 0.25 g., respectively. Treatment of the original filtered inorganic salts with hot water yielded 0.10 g. more product as water-insoluble material. Infrared spectra showed all the solids to be identical although they melted over wide ranges, 190–200° C. This isomer is assigned a trans-structure and will be referred to as the high-melting isomers.

The 0.66 g. of solid was recrystallized from hot acetonitrile to give successive crops of crystals, M.P. 204–206° C., 203–204° C., 202–203° C., for analysis.

*Analysis.*—Calcd. for $C_{36}H_{30}N_{10}P_4$: C, 59.51; H,4.16; N, 19.28; P, 17.05. Found: C, 59.79; 59.66; H, 4.33, 4.22; N, 18.90, 19.44; P, 17.10, 17.25.

From the mother liquors of the high-melting tetramer diazide was obtained another compound melting at 122–133° C. This material had a very clean, sharp infrared spectrum that differed in only three or four absorption bands from the spectrum of the high-melting material. Comparison showed that the major difference is a strong band at 12.61 microns present in the spectrum of the high-melting compound but absent in the spectrum of the low-melting compound, and a band at 11.13 microns present in the spectrum of the low-melting compound but absent in the high-melting one.

With only a limited number of crystallizations (3 or 4) the best material obtained had a melting point of 131–133° C. Repeated crystallizations successively from acetonitrile and from benzene gave material of M.P. 146–148° C.

*Analysis.*—Calcd. for $C_{36}H_{30}N_{10}P_4$: C, 59.51; H, 4.16; N, 19.28; P, 17.05. Found: C, 59.10; H, 4.14; N, 19.29; P, 17.31.

Example II

A large-scale run with 20 g. of impure tetramer dichloride and 20 g. of lithium azide gave 13.1 g. (65%) of high-melting tetramer diazide and 1.2 g. of low-melting material. The materials had spectra identical with those from the small scale reaction. The mother liquor from the large scale run using crude starting material proved intractable. No more than 1.2 g. of low-melting material was obtained from the approximately 5 g. of product remaining in solution after removal of high-melting diazide.

Recrystallization of 2.0 g. of diazide from 150 ml. of refluxing acetonitrile gave 1.45 g. of crystalline diazide, M.P. 204–207° C.

Obviously many modifications and variations of the present invention are possible in the light of the above teachings. It is therefore to be understood that within the scope of the appended claims the invention may be practiced otherwise than as specifically described.

What is claimed is:

1. The compound trans-diazidohexaphenylphosphonitrile tetramer having a melting point of 206–208° C.
2. The compound cis-diazidohexaphenylphosphonitrile tetramer having a melting point of 146–148° C.

References Cited

Herring, "Inorganic Chemistry," vol. 4, pp. 1012–16 (July 1965).

WALTER A. MODANCE, *Primary Examiner.*

JOHN M. FORD, *Assistant Examiner.*